(12) United States Patent
Tsuneki et al.

(10) Patent No.: US 11,087,509 B2
(45) Date of Patent: Aug. 10, 2021

(54) OUTPUT DEVICE, CONTROL DEVICE, AND EVALUATION FUNCTION VALUE OUTPUT METHOD

(71) Applicant: FANUC CORPORATION, Yamanashi (JP)

(72) Inventors: Ryoutarou Tsuneki, Yamanashi (JP); Satoshi Ikai, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 16/429,515

(22) Filed: Jun. 3, 2019

(65) Prior Publication Data
US 2020/0005499 A1 Jan. 2, 2020

(30) Foreign Application Priority Data
Jun. 28, 2018 (JP) .............................. JP2018-122877

(51) Int. Cl.
*G06T 11/20* (2006.01)
*G06N 20/00* (2019.01)
*G05B 13/02* (2006.01)

(52) U.S. Cl.
CPC .......... *G06T 11/20* (2013.01); *G05B 13/0265* (2013.01); *G06N 20/00* (2019.01)

(58) Field of Classification Search
CPC ...... G06T 11/20; G06N 20/00; G05B 13/0265
See application file for complete search history.

(56) References Cited

U.S. PATENT DOCUMENTS

| 2009/0248175 A1* | 10/2009 | Eguchi ..................... G06N 3/08 |
| | | 700/30 |
| 2017/0199510 A1* | 7/2017 | Fujita .................... G05B 13/041 |
| 2018/0164756 A1* | 6/2018 | Yamaguchi ........ G05B 19/4083 |

FOREIGN PATENT DOCUMENTS

| JP | 11-242503 | 9/1999 |
| JP | 2003-061377 | 2/2003 |
| JP | 2009-124803 | 6/2009 |
| JP | 2009-244933 | 10/2009 |
| JP | 2017-84104 | 5/2017 |

(Continued)

OTHER PUBLICATIONS

Notification of Reasons for Refusal dated Jun. 30, 2020 in corresponding Japanese Patent Application No. 2018-122877.

(Continued)

*Primary Examiner* — Chong Wu
(74) *Attorney, Agent, or Firm* — Wenderoth, Lind & Ponack, L.L.P.

(57) ABSTRACT

An output device with which an operator can understand a progress state of machine learning from evaluation function values is provided. The output device includes: an information acquisition unit that acquires a plurality of evaluation function values which use servo data or are calculated using the servo data from a machine learning device that performs machine learning with respect to a servo control device that controls a servo motor that drives a shaft of a machine tool, a robot, or an industrial machine; and an output unit that outputs the plurality of acquired evaluation function values. The output unit may include a display unit that displays the plurality of evaluation function values on a display screen.

15 Claims, 11 Drawing Sheets

(56) References Cited

FOREIGN PATENT DOCUMENTS

JP 2018-097680 6/2018
WO 2016/203614 12/2016

OTHER PUBLICATIONS

Gang Luo, "Toward a Progress Indicator for Machine Learning Model Building and Data Mining Algorithm Execution: A Position Paper", ACM SIGKDD Explorations Newsletter, Nov. 2017, vol. 19, No. 2, pp. 13-24, URL, https://www.ncbi.nlm.nih.gov/pmc/articles/PMC5699516/.

* cited by examiner

OUTPUT DEVICE, CONTROL DEVICE, AND EVALUATION FUNCTION VALUE OUTPUT METHOD

This application is based on and claims the benefit of priority from Japanese Patent Application No. 2018-122877, filed on 28 Jun. 2018, the content of which is incorporated herein by reference.

BACKGROUND OF THE INVENTION

Field of the Invention

The present invention relates to an output device that acquires a plurality of evaluation function values which use servo data or which are calculated using the servo data from a machine learning device that performs machine learning with respect to a servo control device that controls a servo motor that drives a shaft of a machine tool, a robot, or an industrial machine and outputs the acquired evaluation function values and relates to a control device including the output device and an evaluation function value output method.

Related Art

Patent Document 1, for example, discloses a technique of changing a configuration of at least one of a band-limiting filter and a dynamic characteristic compensation filter that forms a learning controller on the basis of an evaluation function value in a servo control device that controls a servo motor that drives a shaft of a machine tool.

Specifically, Patent Document 1 discloses a servo control device including a position command creation unit, a position detection unit for a feed shaft, a position error acquisition unit that calculates a position error, a position control loop, a band-limiting filter that attenuates a high frequency component of the position error, a dynamic characteristic compensation element that advances a phase, a learning controller that includes a band-limiting filter and a dynamic characteristic compensation element, a sine wave sweep input unit that performs sine wave sweeping on a position control loop, a frequency characteristic calculation unit that estimates a gain and a phase of position control loop input and output signals, and a learning control characteristic evaluation function calculation unit that calculates an evaluation function indicating a position control characteristic with the learning controller on the basis of frequency characteristics of actual measurement and frequency characteristics of the learning controller, wherein a configuration of at least one of the hand-limiting filter and the dynamic characteristic compensation filter that form the learning controller is changed on the basis of the value of the evaluation function.

Patent Document 1: Japanese Unexamined Patent Application, Publication No. 2017-84104

SUMMARY OF THE INVENTION

When a machine learning device performs machine learning on a servo control parameter of a servo control device that controls a servo motor that drives a shaft of a machine tool, a robot, or an industrial machine, an evaluation function value related to the servo control parameter under machine learning is not generally displayed until the machine learning ends. Therefore, an operator cannot understand a progress state of the machine learning on the basis of the evaluation function value. Therefore, the operator cannot evaluate the evaluation function value under machine learning and determine whether the machine learning will be continued, interrupted, or ended.

An object of the present invention is to provide an output device that acquires a plurality of evaluation function values from a machine learning device and outputs (displays) the evaluation function values so that an operator can understand a progress state of machine learning from the evaluation function values related to servo control parameters under machine learning and to provide a control device including the output device and an evaluation function value output method.

(1) An output device according to the present invention includes: an information acquisition unit (for example, an information acquisition unit 301 to be described later) that acquires a plurality of evaluation function values which use servo data or are calculated using the servo data from a machine learning device (for example, a machine learning device 200 to be described later) that performs machine learning with respect to a servo control device (for example, a servo control device 100 to be described later) that controls a servo motor (for example, a servo motor 500 to be described later) that drives a shaft of a machine tool, a robot, or an industrial machine; and an output unit (for example, a control unit 305 and a display unit 309, or a control unit 305 and a storage unit 306 to be described later) that outputs the plurality of acquired evaluation function values.

(2) In the output device according to (1), the output unit may include a display unit that displays the plurality of evaluation function values on a display screen.

(3) The output device according to (2) may further include a drawing plotting unit that creates a drawing indicating change over time in the plurality of evaluation. function values during machine learning, and the output unit may display the created drawing on the display screen.

(4) In the output device according to any one of (1) to (3), the output unit may output a smallest value of the plurality of evaluation function values.

(5) In the output device according to any one of (1) to (4), the output unit may output a smallest value of all the evaluation function values acquired from the start of machine learning.

(6) In the output device according to any one of (1) to (5), the output unit may output the plurality of acquired evaluation function values on a real-time basis.

(7) In the output device according to any one of (1) to (5), the output unit may output the plurality of acquired evaluation function values when an operator outputs a display instruction.

(8) In the output device according to any one of (1) to (5), the output unit may output the plurality of acquired evaluation function values when a total of the number of trials from the start of learning reaches a predetermined number of times.

(9) In the output device according to any one of (1) to (5), the output unit may output the plurality of acquired evaluation function values when the evaluation function value is equal to or smaller than a predetermined threshold.

(10) in the output device according to any one of (1) to (5), the output unit may output the plurality of acquired evaluation function values when machine learning is interrupted or ended.

(11) In the output device according to any one of (1) to (10), the output unit may output an interruption instruction to the machine learning device.

(12) In the output device according to any one of (1) to (11), the output unit may output an interruption instruction when a smallest value of all the evaluation function values acquired from the start of machine learning has settled.

(13) A control device according to the present invention includes: the output device according to any one of (1) to (12);
a servo control device that controls a servo motor that drives a shaft of a machine tool, a robot, or an industrial machine;
a machine learning device that performs machine learning with respect to the servo control device; and
a numerical control device that outputs a control command to the servo control device.

(14) In the control device according to (13), the output device may be included in one of the servo control device, the machine learning device, and the numerical control device.

(15) An evaluation function value output method according to the present invention is an evaluation function value output method in an output device that outputs an evaluation function value used for machine learning of a servo control device that controls a servo motor that drives a shaft of a machine tool, a robot, or an industrial machine, the method including:
acquiring a plurality of evaluation function values which use servo data or are calculated using the servo data from a machine learning device that performs machine learning with respect to the servo control device; and
outputting the plurality of acquired evaluation function values.

According to the present invention, since a plurality of evaluation function values are acquired from the machine learning device and the evaluation function values are output so as to be understood by an operator, it is possible to understand a progress state of machine learning from the evaluation function values.

DETAILED DESCRIPTION OF THE INVENTION

Hereinafter, embodiments of the present invention will be described with reference to the drawings.

First Embodiment

Figure 1:
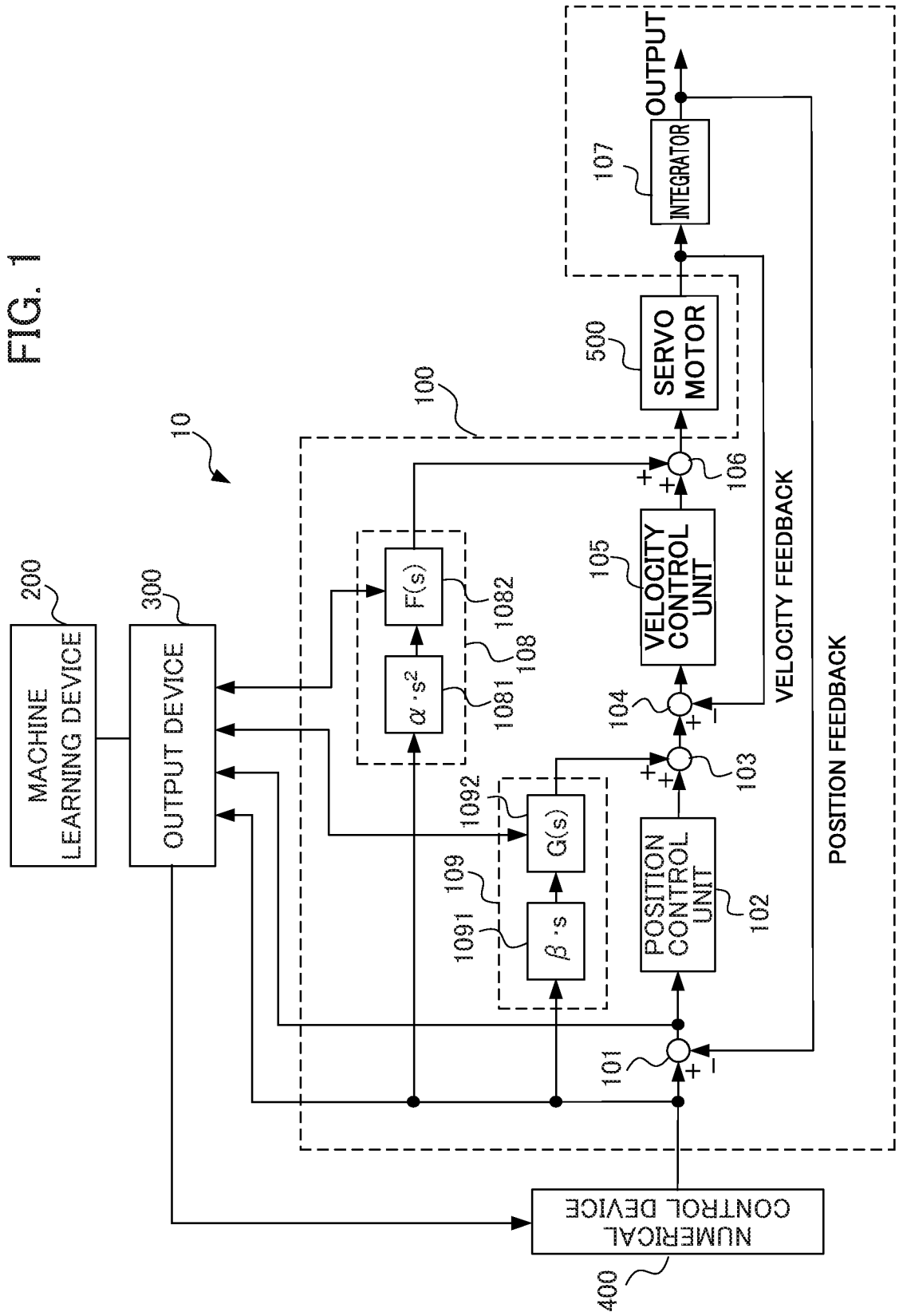
FIG. 1 is a block diagram illustrating a configuration example of a servo control device included in a control device according to a first embodiment of the present invention.

FIG. 1 is a block diagram illustrating a configuration example of a servo control device included in a control device according to a first embodiment of the present invention. A control device 10 illustrated in FIG. 1 includes a servo control device 100, a machine learning device 200, an output device 300, and a numerical control device 400. FIG. 1 illustrates a configuration of the servo control device 100 in detail, and a detailed configuration of the machine learning device 200 and the output device will be described later. The servo control device 100 is connected to the numerical control device 400, and the output device 300 is connected to the servo control device 100, the machine learning device 200, and the numerical control device 400. The servo control device 100 controls rotation of a servo motor 500. The machine learning device 200 performs machine learning on a control parameter of the servo control device 100. The output device 300 outputs information during machine learning of the machine learning device 200 and the results of the machine learning. Moreover, the output device 300 also functions as an adjustment device that controls relay of information between the machine learning device 200 and the servo control device 100 and the operation of the machine learning device 200 and the servo control device 100. Furthermore, the output device 300 outputs an activation instruction for any one of a normal machining program, a learning machining program (an evaluation program), a verification machining program (a verification program) slower than the learning machining program, and a verification machining program (a verification program) faster than the learning machining program to the numerical control device 400. The numerical control device 400 stores the normal machining program, the learning machining program, the verification program slower than an evaluation program which is a machining program during learning, and the verification program faster than the learning machining program in a storage unit.

The numerical control device 400 creates a position command value on the basis of the machining program that operates the servo motor 500. The servo motor 500 is included in a machine tool, for example. In a machine tool, when a table having a workpiece (a work) mounted thereon moves in an X-axis direction and a Y-axis direction, the servo control device 100 and the servo motor 500 illustrated in FIG. 1 are provided in the X-axis direction and the Y-axis direction, respectively. When the table is moved in directions of three or more axes, the servo control device 100 and the servo motor 500 are provided in the respective axis directions. The numerical control device 400 sets a feed rate and creates a position command value so that a machining shape designated by the machining program is obtained.

First, the servo control device 100 will be described. As illustrated in FIG. 1, the servo control device 100 includes a subtractor 101, a position control unit 102, an adder 103, a subtractor 104, a velocity control unit 105, an adder 106, an integrator 107, a velocity feedforward calculation unit 108, and a position feedforward calculation unit 109. The adder 106 is connected to the servo motor 500. The velocity feedforward calculation unit 108 includes a double differentiator 1081 and a velocity feedforward processing unit 1082. The position feedforward calculation unit 109 includes a differentiator 1091 and a position feedforward processing unit 1092.

A position command value output from the numerical control device 400 is input to the subtractor 101, the velocity feedforward calculation unit 108, the position feedforward calculation unit 109, and the output device 300. The subtractor 101 receives a position command input from the numerical control device 400, calculates a difference between the position command and a feedback detection position, and outputs the difference to the position control unit 102 and the output device 300 as a position error.

The position control unit 102 outputs a value obtained by multiplying the position error by a position gain Kp to the adder 103 as a velocity command value. The differentiator 1091 of the position feedforward calculation unit 109 differentiates the position command value and multiplies the differentiation result by a constant β, and the position feedforward processing unit 1092 performs a position feedforward process represented by a transfer function G(s) in Expression 1 (indicated by Math. 1 below) on the output of the differentiator 1091 and outputs the processing result to the subtractor 104 as a position feedforward term. Coefficients $a_i$ and $b_j$ (X≥i, j≥0, where X is a natural number) in Expression 1 are coefficients of the transfer function G(s) of the position feedforward processing unit 1092.

[Math. 1]

The adder 103 adds the velocity command value and the output value (the position feedforward term) of the position feedforward calculation unit 109 and outputs an addition result to the subtractor 104 as a feedforward-controlled velocity command value. The subtractor 104 calculates a difference between the output of the adder 103 and a feedback velocity detection value and outputs the difference to the velocity control unit 105 as a velocity error.

The velocity control unit 105 adds a value obtained by multiplying and integrating the velocity error by an integral gain K1v and a value obtained by multiplying the velocity error by a proportional gain K2v and outputs an addition result to the adder 106 as a torque command value.

The double differentiator 1081 of the velocity feedforward calculation unit 108 differentiates the position command value two times and multiplies a differentiation result by a constant α, and the velocity feedforward processing unit 1082 performs a velocity feedforward process represented by a transfer function F(s) in Expression 2 (indicated by Math. 2 below) on the output of the double differentiator 1081 and outputs the processing result to the adder 106 as a velocity feedforward term. Coefficients $c_i$ and $d_j$ (X≥i, j≥0, where X is a natural number) in Expression 2 are coefficients of the transfer function of the velocity feedforward processing unit 1082.

[Math. 2]

The adder 106 adds the torque command value and an output value (the velocity feedforward term) of the velocity feedforward calculation unit 108 and outputs an addition result to the servo motor 500 as a feedforward-controlled torque command value to drive the servo motor 500.

A rotational angular position of the servo motor 500 is detected by a rotary encoder serving as a position detection unit associated with the servo motor 500, and a velocity detection value is input to the subtractor 104 as a velocity feedback. The velocity detection value is integrated by the integrator 107 to be a position detection value, and the position detection value is input to the subtractor 101 as a position feedback. The servo control device 100 is configured in this manner.

Figure 2:
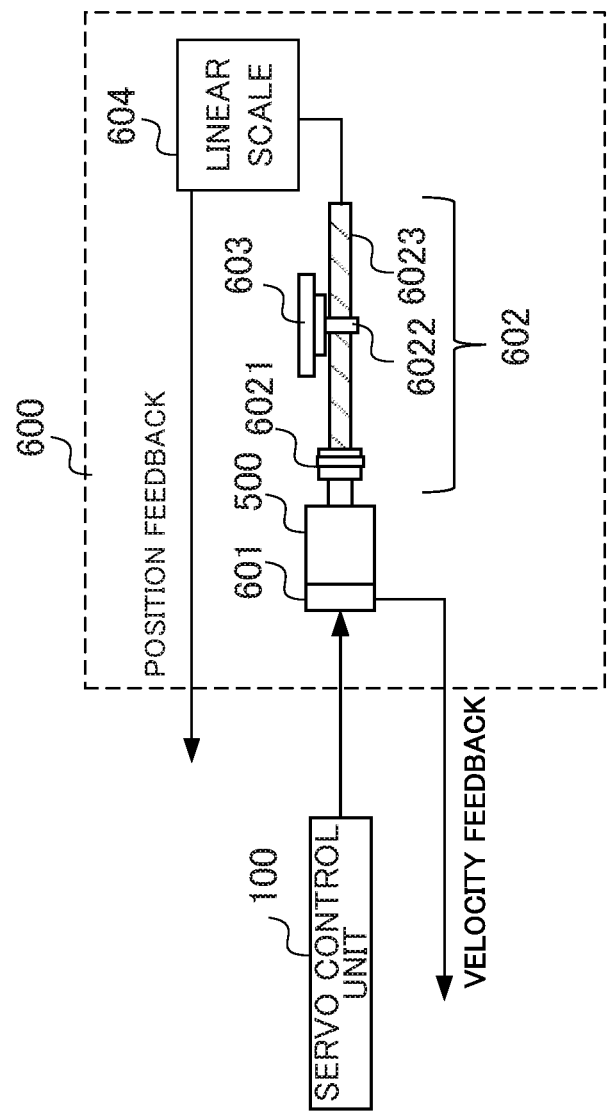
FIG. 2 is a block diagram illustrating a portion of a machine tool including a servo motor, which is an example of a control target of the servo control device.

Next, a control target 600 including the servo motor 500 controlled by the servo control device 100 will be described. FIG. 2 is a block diagram illustrating a portion of a machine tool including a servo motor, which is an example of the control target 600 of the servo control device 100. The servo control device 100 causes the servo motor 500 to move a table 603 with the aid of a coupling mechanism 602 to thereby machine a workpiece (a work) mounted on the table 603. The coupling mechanism 602 includes a coupling 6021 coupled to the servo motor 500 and a ball screw 6023 fixed to the coupling 6021, and a nut 6022 is screwed into the ball screw 6023. With rotation of the servo motor 500, the nut 6022 screwed into the ball screw 6023 moves in an axial direction of the ball screw 6023. With movement of the nut 6022, the table 603 moves.

A rotational angular position of the servo motor 500 is detected by the rotary encoder 601 serving as a position detection unit associated with the servo motor 500. As described above, the detected signal is used as a velocity feedback. The detected signal is integrated by the integrator 107 and is used as a position feedback. An output of a linear scale 604 attached to an end of the ball screw 6023 to detect a moving distance of the ball screw 6023 may be used as a position feedback. Moreover, a position feedback may be generated using an acceleration sensor.

Next, the machine learning device 200 will be described. The machine learning device 200 performs machine learning (hereinafter referred to as learning) on a coefficient of the transfer function of the position feedforward processing unit 1092 and a coefficient of the transfer function of the velocity feedforward processing unit 1082, for example. The machine learning device 200 performs learning of the coefficient of the transfer function of the velocity feedforward processing unit 1082 separately from learning of the coefficient of the transfer function of the position feedforward processing unit 1092 and performs learning of the coefficient of the transfer function of the velocity feedforward processing unit 1082 on the inner side (the inner loop) than the position feedforward processing unit 1092 earlier than the learning of the coefficient of the transfer function of the position feedforward processing unit 1092. Specifically, the machine learning device 200 fixes the coefficient of the transfer function of the position feedforward processing unit 1092 and learns an optimal value of the coefficient of the transfer function of the velocity feedforward processing unit 1082. After that, the machine learning device 200 fixes the coefficient of the transfer function of the velocity feedforward processing unit 1082 to the optimal value obtained by learning and learns the coefficient of the transfer function of the position feedforward processing unit 1092. By doing so, it is possible to perform learning related to optimization of the coefficient of the transfer function of the position feedforward processing unit 1092 and to suppress a variation in the position error under the condition of the velocity feedforward term optimized by the learning. Therefore, when the learning of the coefficient of the transfer function of the velocity feedforward processing unit 1082 on the inner side (the inner loop) than the position feedforward processing unit 1092 is performed earlier than the learning of the coefficient of the transfer function of the position feedforward processing unit 1092, it is possible to suppress a variation in the position error and to achieve high accuracy in the following description, machine learning (reinforcement learning) related to the coefficient of the transfer function of the velocity feedforward processing unit 1082 will be described as an example. In the present embodiment, although reinforcement learning is described as an example of machine learning, the machine learning is not particularly limited to the reinforcement learning. The machine learning device 200 performs machine learning (hereinafter referred to as learning) on the coefficient of the transfer function of the velocity feedforward processing unit 1082 by executing a predetermined machining program (hereinafter also referred to as a "learning machining program" or an "evaluation program").

Figure 3:
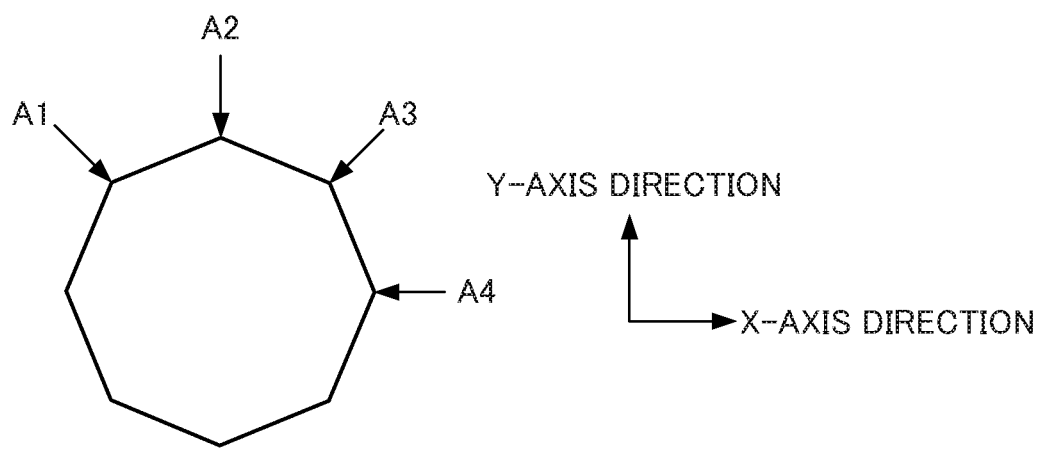
FIG. 3 is a diagram illustrating a case in which a machining shape designated by a machining program during learning is an octagon.
Figure 4:
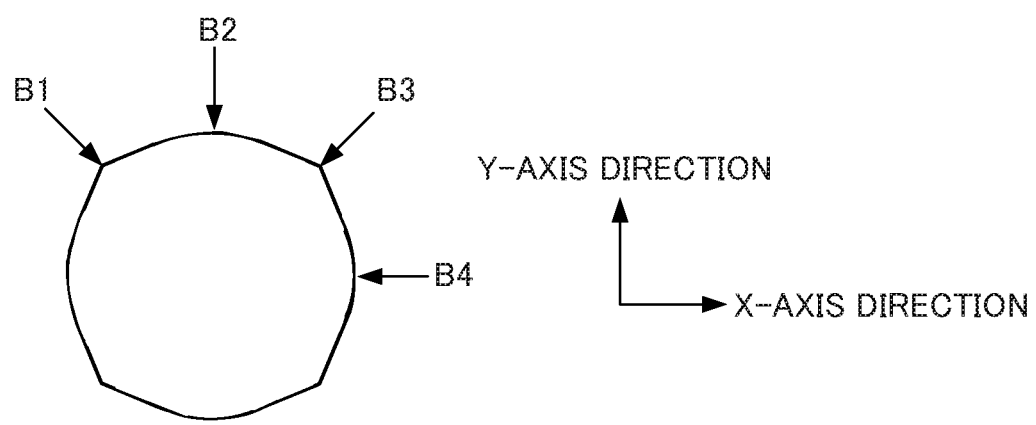
FIG. 4 is a diagram illustrating a case in which a machining shape is a shape in which the corners of an octagon are alternately replaced with arcs.

Here, a machining shape designated by the learning machining program is an octagon illustrated in FIG. 3 or a shape in which the corners of an octagon are alternately replaced with arcs illustrated in FIG. 4, for example. In the present embodiment, it is assumed that the machine learning device 200 performs learning of the coefficient related to the transfer function G(s) by evaluating vibration when a rotation speed of linear control is changed at the positions A1 and A3 and/or the positions B1 and B3 of the machining shape designated by the learning machining program and examining the influence on a position error. The machine learning device 200 may perform learning of the coefficient related to a transfer function for calculating a correction amount for suppressing coasting (so-called "quadrant glitches") by evaluating quadrant glitches occurring when a rotating direction is reversed at the positions A2 and A4 and/or the positions B2 and B4 of the machining shape and examining the influence on a position error.

Prior to description of respective functional blocks included in the machine learning device 200, first, a basic mechanism of reinforcement learning will be described. An agent (corresponding to the machine learning device 200 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, a method of learning for maximizing the reward to be obtained in the future) by learning an action. This represents that, in the present embodiment, such an action that affects the future, for example, an action of selecting action information for reducing a position error, can be obtained.

Here, although an arbitrary learning method is used as the reinforcement learning, in the description below, Q-learning which is a method of learning a value Q(S,A) of selecting an action A under a certain environment state S will be described as an example. An object of the Q-learning is to select an action A having the highest value Q(S,A) as an optimal action among actions A that can be taken in a certain state S.

However, at an initial time at which the Q-learning starts, the correct value of the value Q(S,A) is not known at all for a combination of the state S and the action A. Therefore, the agent learns the correct value Q(S,A) by selecting various actions A under a certain state S and selecting a better action on the basis of rewards given for the selected actions A.

Since it is desired to maximize a total reward obtained in the future, it is aimed to finally attain a relation of Q(S,A)=E[Σ(γ$^t$)r$_t$]. Here, E[ ] indicates an expected value, t indicates time, γ is a parameter called a discount factor to be described later, r$_t$ is a reward at time t, and Σ is the sum at time t. In this expression, the expected value is an expected value when the state was changed according to an optimal action. However, since it is unclear which action is optimal in the process of Q-learning, reinforcement learning is performed while searching for an optimal action by performing various actions. An update expression of such a value Q(S,A) can be represented by Expression 3 below (Math. 3).

[Math. 3]

In Expression 3, S$_t$ indicates an environment state at time t, and A$_t$ indicates an action at time t. By the action A$_t$, the state changes to S$_{t+1}$. r$_{t+1}$ indicates a reward obtained by the change in the state. Moreover, a term with max is a multiplication of the Q value by γ when an action A having the highest Q value known at that moment was selected under the state S$_{t+1}$. Here, γ is a parameter of 0<γ≤1 and is called a discount rate. Moreover, α is a learning coefficient and is in the range of 0<α≤1.

Expression 3 indicates a method of updating a value Q(S$_t$, A$_t$) of an action A$_t$ in a state S$_t$ on the basis of a returning reward rt+1 when the action A$_t$ is performed. This update expression indicates that if the value max$_a$ Q(S$_{t+1}$, A) of the best action in the next state St+1 associated with an action At is larger than the value Q(S$_t$, A$_t$) of an action A$_t$ in the state S$_t$, Q(S$_t$, A$_t$) is increased, and if otherwise, Q(S$_t$, A$_t$) is decreased. That is, the value of a certain action in a certain state approaches the value of the best action in the next state associated with the action. However, although this difference differs depending on the discount rate γ and the reward r$_{t+1}$, the update equation has such a structure that the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to settle when the values of the value functions Q(S,A) of all state-action pairs are to be calculated since the number of states is too large.

Thus, Q-learning may use an existing technique called a deep Q-network (DQN). Specifically, an agent may calculate the value of the value Q(S,A) by constructing a value function Q using an appropriate neural network and approximating the value function Q with the appropriate neural network by adjusting the processes of the neural network. By using DQN, it is possible to shorten the time required for settling of Q-learning. The details of DQN are disclosed in Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. Specifically, the machine learning device 200 learns a value Q of selecting an action A of adjusting the values of the coefficients $c_i$ and $d_j$ of the transfer function of the velocity feedforward processing unit 1082, associated with a servo state S such as commands and feedbacks including the values of the coefficients $c_i$ and $d_j$ ($X \geq i$, $j \geq 0$) of the transfer function of the velocity feedforward processing unit 1082 of the servo control device 100 and the position commands and the position error information of the servo control device 100 acquired by executing the learning machining program.

The machine learning device 200 observes the state information S including the servo state such as commands and feedbacks including the position commands and the position error information of the servo control device 100 at the positions A1 and A3 and/or the positions B1 and B3 of the machining shape by executing the learning machining program on the basis of the values of the coefficients $c_i$ and $d_j$ of the transfer function of the velocity feedforward processing unit 1082 to determine the action A. The machine learning device 200 returns a reward whenever the action A is executed. The machine learning device 200 searches for the optimal action A so that a total future reward is maximized by trial-and-error learning. By doing so, the machine learning device 200 can select an optimal action A (that is, the optimal coefficients $c_i$ and $d_j$ of the velocity feedforward processing unit 1082) with respect to the state S including the servo state such as commands and feedbacks including the position command and the position error information of the servo control device 100 acquired by executing the learning machining program on the basis of the values of the coefficients $c_i$ and $d_j$ of the transfer function of the velocity feedforward processing unit 1082. The machine learning device 200 can learn the coefficients $c_i$ and $d_j$ of the transfer function of the velocity feedforward processing unit 1082 during a linear operation.

That is, the machine learning device 200 can select such an action A (that is, the coefficients $c_i$ and $d_j$ of the velocity feedforward processing unit 1082) that minimizes the position error acquired by executing the learning machining program by selecting such an action A that maximizes the value of Q among the actions A applied to the coefficients $c_i$ and $d_j$ of the transfer function of the velocity feedforward processing unit 1082 related to a certain state S on the basis of the value function Q learned by the machine learning device 200.

Figure 5:
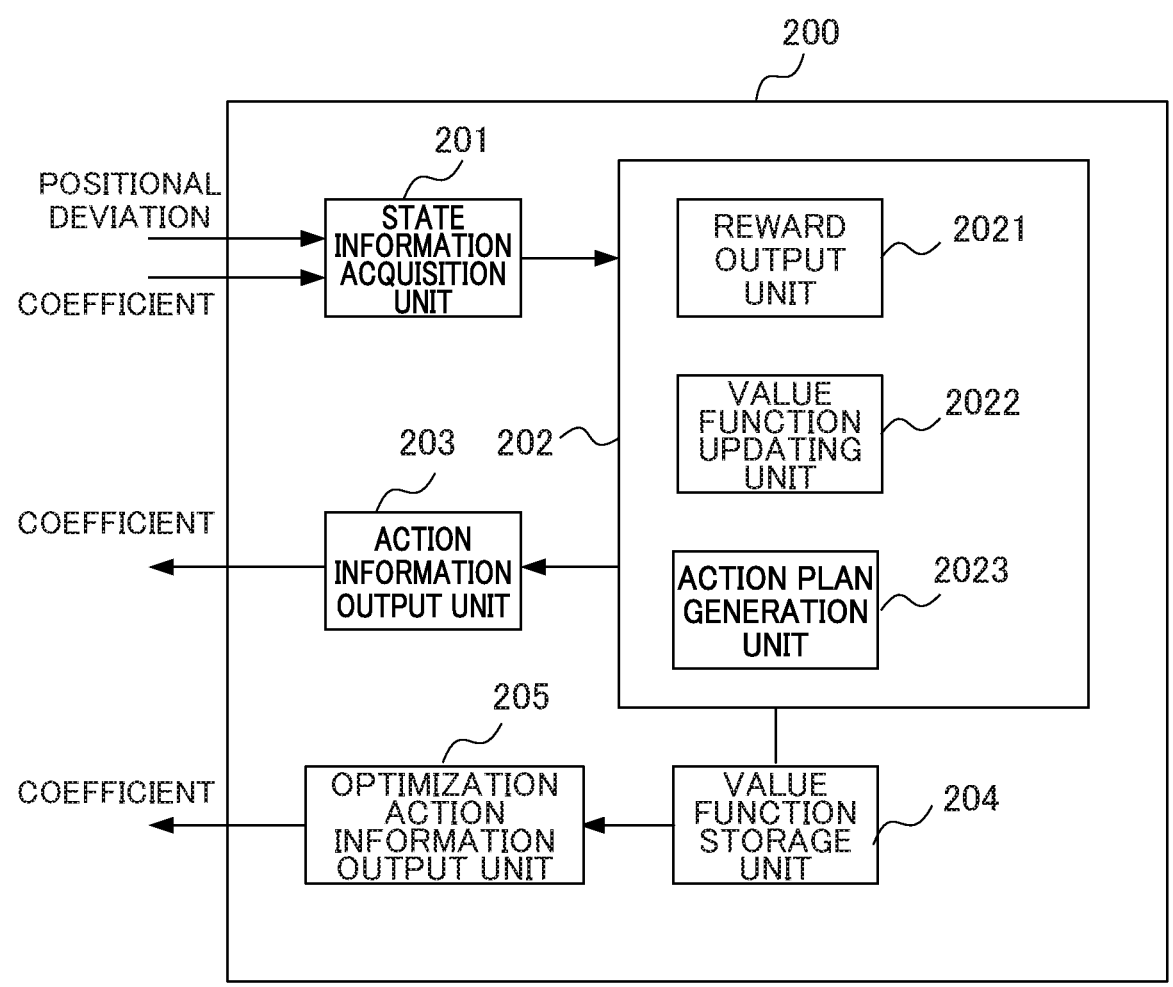
FIG. 5 is a block diagram illustrating a machine learning device according to the first embodiment of the present invention.

FIG. 5 is a block diagram illustrating the machine learning device 200 according to the first embodiment. As illustrated in FIG. 5, in order to perform the reinforcement learning, the machine learning device 200 includes a state information acquisition unit 201, a learning unit 202, an action information output unit 203, a value function storage unit 204, and an optimization action information output unit 205. The learning unit 202 includes a reward output unit 2021, a value function updating unit 2022, and an action information generation unit 2023.

The state information acquisition unit 201 acquires, from the servo control device 100, the state S including a servo state such as commands and feedbacks including the position command and the position error information of the servo control device 100 acquired by executing the learning machining program on the basis of the coefficients $c_i$ and $d_j$ of the transfer function of the velocity feedforward processing unit 1082 of the servo control device 100. The state information S corresponds to an environment state S in the Q-learning. The state information acquisition unit 201 outputs the acquired state information S to the learning unit 202.

The coefficients $c_i$ and $d_j$ of the velocity feedforward processing unit 1082 at a time point at which the Q-learning starts initially are generated by a user in advance. In the present embodiment, the initial setting values of the coefficients $c_i$ and $d_j$ of the velocity feedforward processing unit 1082 created by the user are adjusted to optimal values by the reinforcement learning. The coefficient $\beta$ of the differentiator 112 is set to a fixed value (for example, $\alpha=1$). Moreover, the initial setting values of the coefficients $c_i$ and $d_j$ of the velocity feedforward processing unit 1082 are set such that $c_0=1$, $c_1=0$, $c_2=0$, and $d_0=1$, $d_1=0$, $d_2=0$. The dimensions m and n of the coefficients $c_i$ and $d_j$ are set in advance. That is, $0 \leq i \leq m$ for $c_i$, and $0 \leq j \leq n$ for $d_j$. When a machine tool is adjusted by an operator, machine learning may be performed using the adjusted values as the initial values of the coefficients $c_i$ and $d_j$.

The learning unit 202 is a unit that learns the value Q(S,A) when a certain action A is selected under a certain environment state S.

The reward output unit 2021 is a unit that calculates a reward when the action A is selected under a certain state S. Here, a set (a position error set) of position error which are state variables of the state S will be denoted by PD(S), and a position error set which is state variables related to state information S' changed from the state S due to the action information A will be denoted by PD(S'). Moreover, the evaluation function value of the position error in the state S is a value calculated on the basis of a predetermined evaluation function f(PD(S)). The action information A is the correction of the coefficients $c_i$ and $d_j$ (i and j are 0 or positive integers) of the velocity feedforward processing unit 1082. Here, a set of position error which are state variables of the state S means a set of position error measured within a predetermined range including the positions A1 and A3 and/or the positions B1 and B3 of the machining shape. The evaluation function value obtained by the evaluation function f can be obtained using a position error serving as servo data or by calculating the same from the position error. The following functions can be used as the evaluation function f, for example. A function that calculates an integrated value of an absolute value of a position error $$\int |e| dt$$

A function that calculates an integrated value by a weighting an absolute value of a position error with time $$\int t|e| dt$$

A function that calculates an integrated value of a 2n-th power (n is a natural number) of an absolute value of a position error $$\sim e^{2n} dt \text{ (n is a natural number)}$$

A function that calculates a maximum value of an absolute value of a position error $$\text{Max}\{|e|\}$$

The reward output unit 2021 stores a set of evaluation function values obtained in each trial in the storage unit for respective numbers of trials and outputs the set of evaluation function values in correlation with the number of trials to the output device 300 when there is an output request for the evaluation function value from the output device 300. The reward output unit 2021 also stores an adjustment target such as velocity feedforward and position feedforward, the number or trials, and the largest number of trials and outputs the same to the output device 300 together with the set of evaluation function values. Moreover, the reward output unit 2021 stores a set of position error when machining is performed using a control parameter before adjustment (at the start of learning) and a set of control parameters after adjustment (at the end of learning) in the storage unit and outputs the set of position error when there is an output request for the set of position error from the output device 300.

In this case, the reward output unit 2021 sets the value of a reward to a negative value when the value f(PD(S')) of the position error of the servo control device 100 operated on the basis of the velocity feedforward processing unit 1082 after the correction related to the state information S' corrected by the action information A is larger than the value f(PD(S)) of the position error of the servo control device 100 operated on the basis of the velocity feedforward processing unit 1082 before the correction related to the state information S before being corrected by the action information A.

On the other hand, the reward output unit 2021 sets the value of a reward to a positive value when the value f(PD(S')) of the position error of the servo control device 100 operated on the basis of the velocity feedforward processing unit 1082 after the correction related to the state information S' corrected by the action information A is smaller than the value f(PD(S)) of the position error of the servo control device 100 operated on the basis of the velocity feedforward processing unit 1082 before the correction related to the state information S before being corrected by the action information A. Moreover, the reward output unit 2021 may set the value of a reward to zero when the value f(PD(S')) of the position error of the servo control device 100 operated on the basis of the velocity feedforward processing unit 1082 after the correction related to the state information S' corrected by the action information A is equal to the value f(PD(S)) of the position error of the servo control device 100 operated on the basis of the velocity feedforward processing unit 1082 before the correction related to the state information S before being corrected by the action information A.

Furthermore, the negative value when the value f(PD(S')) of the position error in the state S' after execution of the action A is larger than the value f(PD(S)) of the position error in the previous state S may increase according to a proportion. That is, the negative value may increase according to the degree of increase in the value of the position error. In contrast, the positive value when the value f(PD(S')) of the position error in the state S' after execution of the action A is smaller than the value f(PD(S)) of the position error in the previous state S may increase according to a proportion. That is, the positive value may increase according to the degree of decrease in the value of the position error.

The value function updating unit 2022 updates the value function Q stored in the value function storage unit 204 by performing Q-learning on the basis of the state S, the action A, the state S' when the action A was applied to the state S, and the value of the reward calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Batch learning is a learning method of applying a certain action A to a present state S and repeated attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generating unit 2023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the coefficients $c_i$ and $d_j$ of the velocity feedforward processing unit 1082 of the servo control device 100 in the process of Q-learning. More specifically, the action information generation unit 2023 adds or subtracts the coefficients $c_i$ and $d_j$ of the velocity feedforward processing unit 1082 included in the action A incrementally (for example, with a step of approximately 0.01) with respect to the coefficients $c_i$ and $d_j$ of the velocity feedforward processing unit 1082 included in the state S, for example.

When the coefficients $c_i$ and $d_j$ of the velocity feedforward processing unit 1082 are increased or decreased, the state S transitions to the state S', and a plus reward (a positive reward) is returned, the action information generation unit 2023 may select a policy of selecting such an action A' that further decreases the value of the position error such as incrementally increasing or decreasing the coefficients $c_i$ and $d_j$ of the velocity feedforward processing unit 1082 similarly to the previous action as the next action A'.

In contrast, when a minus reward (a negative reward) is returned, the action information generation unit 2023 may select a policy of selecting such an action A' that decreases the position error to be smaller than the previous value such as incrementally decreasing or increasing the coefficients $c_i$ and $d_j$ of the velocity feedforward processing unit 1082 contrarily to the previous action as the next action A', for example.

The action information generation unit 2023 may select a policy of selecting the action A' according to a known method such as a greedy method of selecting an action A' having the highest value Q(S,A) among the values of presently estimated actions A and an $\epsilon$-greedy method of randomly selecting an action. A' with a certain small probability $\epsilon$ and selecting an action A' having the highest value Q(S,A) in other cases.

The action information output unit 203 is a unit that transmits the action information A output from the learning unit 202 to the servo control device 100. As described above, the servo control device 100 finely adjusts the present state S (that is, the presently set coefficients $c_i$ and $d_j$ of the velocity feedforward processing unit 1082) on the basis of the action information to thereby transition to the next state S' (that is, the compensated coefficients $c_i$ and $d_j$ of the velocity feedforward processing unit 1082).

The value function storage unit 204 is a storage device that stores the value function Q. The value function Q may be stored as a table (hereinafter referred to as an action value table) for each state S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in a manner of being distributed to the respective machine learning devices 200, it is possible to improve the reinforcement learning efficiency.

The optimization action information output unit 205 generates the action information A (hereinafter referred to as "optimization action information") for causing the velocity feedforward processing unit 1082 to perform an operation of maximizing the value Q(S,A) on the basis of the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information on the basis of the value function Q and outputs the generated action information to the servo control device 100 (the velocity feedforward processing unit 1082). The optimization action information includes information that corrects the coefficients $c_i$ and $d_j$ of the velocity feedforward processing unit 1082 similarly to the action information that the action information output unit 203 outputs in the process of Q-learning.

In the servo control device 100, the coefficients $c_i$ and $d_j$ of the velocity feedforward processing unit 1082 are compensated on the basis of the action information. With the above-described operations, the machine learning device 200 can perform learning and optimization of the coefficients $c_i$ and $d_j$ of the velocity feedforward processing unit 1082 and operate so as to reduce the position error value. As described above, by using the machine learning device 200 according to the present embodiment, it is possible to simplify the adjustment of the correction parameters (the coefficients $c_i$ and $d_j$) of the velocity feedforward processing unit 1082 of the servo control device 100. With the adjustment of the correction parameters (the coefficients $c_i$ and $d_j$), the velocity feedforward term of the velocity feedforward processing unit 1082 is adjusted.

Hereinabove, the functional blocks included in the servo control device 100 and the machine learning device 200 have been described. In order to realize these functional blocks, the servo control device 100 and the machine learning device 200 each include an arithmetic processing unit such as a central processing unit (CPU). The servo control device 100 and the machine learning device 200 each further include an auxiliary storage device such as a hard disk drive (HDD) for storing various control programs such as application software or an operating system (OS) and a main storage device such as a random access memory (RAM) for storing data temporarily required when the arithmetic processing device executes a program.

In each of the servo control device 100 and the machine learning device 200, the arithmetic processing device reads an application or an OS from the auxiliary storage device, and develops the read application software or OS in the main storage device to perform arithmetic processing on the basis of the read application software or OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, graphics processing units (CPUs) may be mounted on a personal computer and be used for arithmetic processing associated with the machine learning using a technique called general-purpose computing on graphics processing units (GPGPUs). In this way, high velocity processing can be performed. Furthermore, in order for the machine learning device 200 to perform higher velocity processing, a computer cluster may be built using a plurality of computers equipped with such GPUs, and the plurality of computers included in the computer cluster may perform parallel processing.

While the learning of the coefficients of the velocity feedforward processing unit 1082 by the machine learning device 200 has been described, the machine learning of the coefficients of the transfer function of the position feedforward processing unit 1092 is performed in a similar manner. That is, the learning operation can be described by substituting the velocity feedforward processing unit 1082 of the first embodiment with the position feedforward processing unit 1092 and the coefficients $c_i$ and $d_j$ of the velocity feedforward processing unit 1082 with the coefficients $a_i$ and $b_j$ of the transfer function of the position feedforward processing unit 1092.

In the present embodiment, although the machine learning device 200 performs learning of the coefficients of the transfer function of the velocity feedforward processing unit 1082 to optimize the coefficients of the transfer function of the velocity feedforward processing unit 1082 and then performs learning of the coefficients of the transfer function of the position feedforward processing unit 1092, the present embodiment is not limited thereto. For example, the machine learning device 200 may learn the coefficients of the transfer function of the position feedforward processing unit 1092 and the coefficients of the transfer function of the velocity feedforward processing unit 1082 simultaneously. However, when the machine learning device 200 learns the coefficients simultaneously, the two learning operations may interfere with each other and the amount of information processed may increase.

In the present embodiment, the servo control device 100 includes the position feedforward calculation unit 109 and the velocity feedforward calculation unit 108. However, the servo control device 100 may include either one of the position feedforward calculation unit 109 or the velocity feedforward calculation unit 108. In this case, for example, when the servo control device 100 includes the position feedforward calculation unit 109 only, the double differentiator 1081, the velocity feedforward processing unit 1082, and the adder 106 are not necessary.

Figure 6:
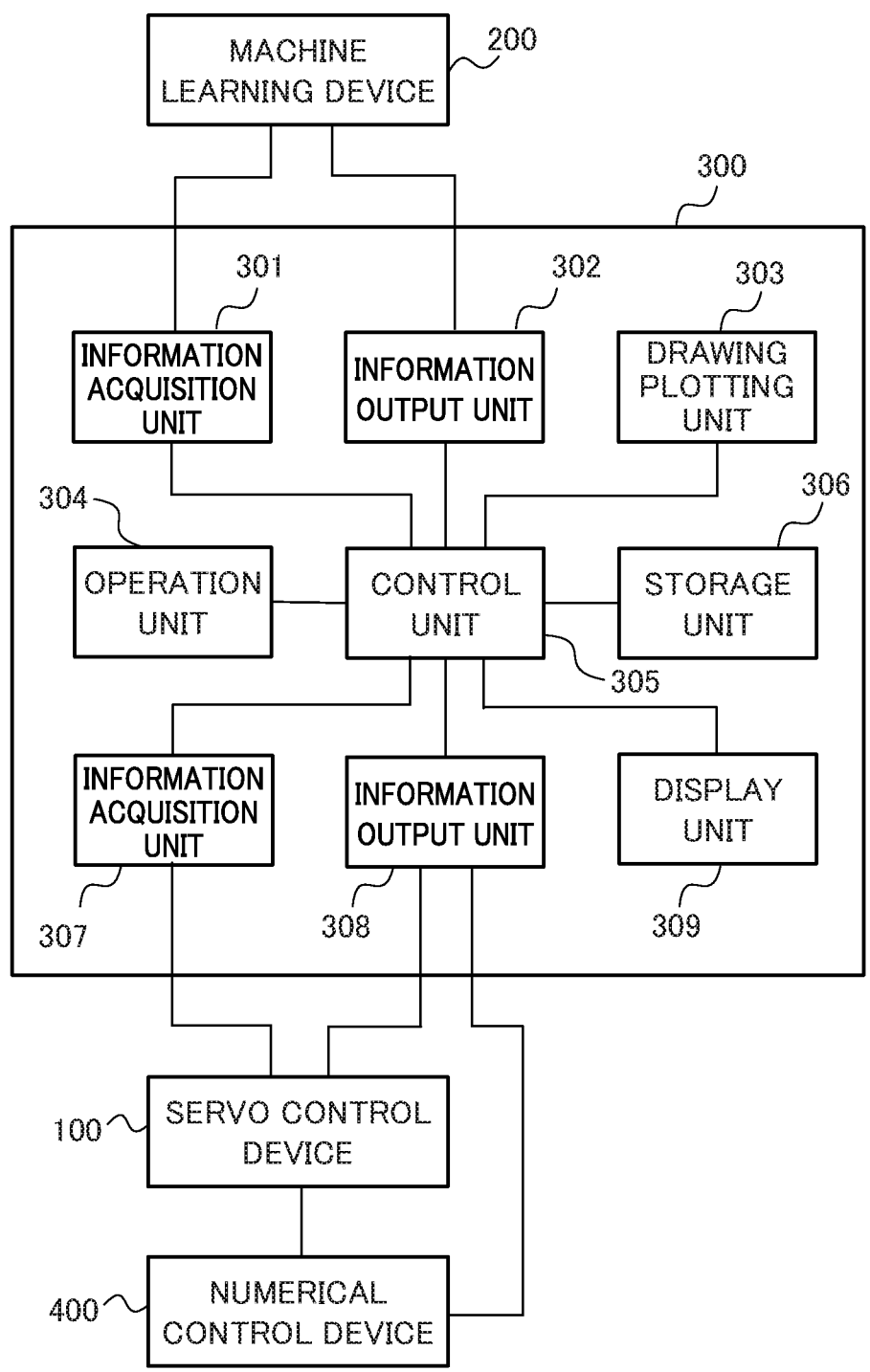
FIG. 6 is a block diagram illustrating a configuration example of an output device included in the control device according to the first embodiment of the present invention.

Next, the output device 300 will be described. FIG. 6 is a block diagram illustrating a configuration example of an output device included in the control device according to the first embodiment of the present invention. As illustrated in FIG. 6, the output device 300 includes an information acquisition unit 301, an information output unit 302, a drawing plotting unit 303, an operation unit 304, a control unit 305, a storage unit 306, an information acquisition unit 307, an information output unit 308, and a display unit 309. The information acquisition unit 301 serves as an information acquisition unit that acquires a plurality of evaluation functions from the machine learning device. The control unit 305 and the display unit 309 serve as an output unit that outputs an evaluation function. The display unit 309 of the output unit may be a liquid crystal display device, a printer, and the like. Output may include storing information in the storage unit 306, and, in such a case, the output unit serves as the control unit 305 and the storage unit 306.

The output device 300 has arm output function of illustrating change in an evaluation function value (for example, the evaluation function value f(PD(s)) related to the state S) in a learning operation (specifically, reinforcement learning) during machine learning of the machine learning device 200 using a figure or characters and illustrating an adjustment result (for example, suppression of a position error) after the reinforcement learning and a verification result of machine learning using a figure or characters. Moreover, the output device 300 has an adjustment function of relaying information (for example, a position error, a position command, the coefficient of the velocity feedforward calculation unit, and correction information of the coefficient of the velocity feedforward calculation unit) between the machine learning device 200 and the servo control device 100 and controlling (for example, outputting a learning program activation instruction to the machine learning device) the operation of the machine learning device 200. Furthermore, the output device 300 also has an adjustment function of outputting an activation instruction for any one of a normal machining program, a learning machining program (an evaluation program), a verification machining program (a verification program) slower than the learning machining program, and a verification machining program. (a verification program) faster than the learning machining program.

Figure 7:
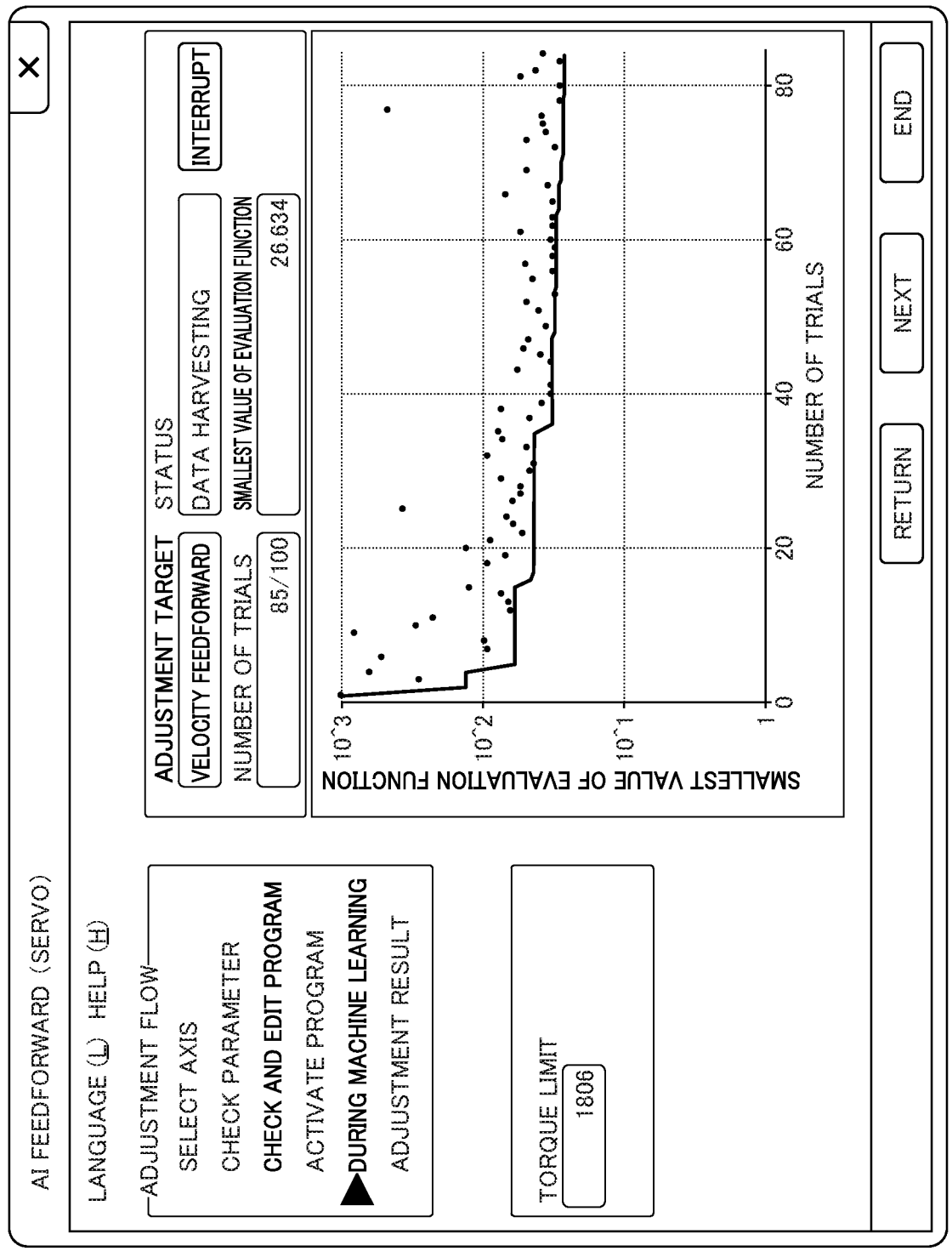
FIG. 7 is a diagram illustrating an example of a display screen when an evaluation function value related to a state S is displayed on a display unit 309 during machine learning according to a progress state of the machine learning.
Figure 8:
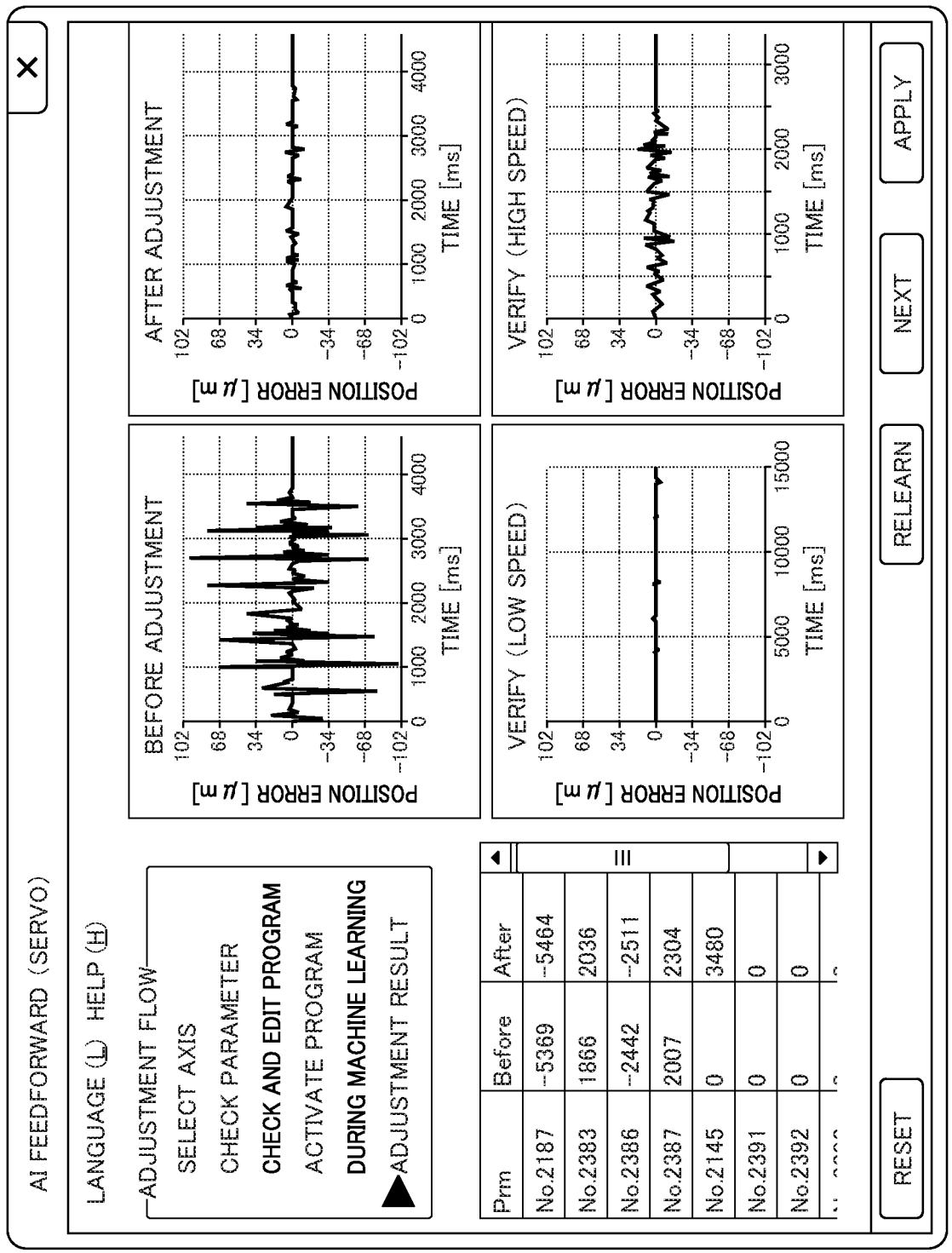
FIG. 8 is a diagram illustrating an example of a display screen when the waveforms of position error before and after adjustment after the machine learning are displayed on the display unit.

The information output function of the machine learning device 200 will be described with reference to FIGS. 6 to 8. FIG. 7 is a diagram illustrating an example of a display screen when an evaluation function value f(PD(S)) related to a state S is displayed on the display unit 309 during machine learning according to a progress state of the machine learning, and FIG. 8 is a diagram illustrating an example of a display screen when position error before and after adjustment after the machine learning are displayed on the display unit 309.

First, a case in which the output device 300 outputs an evaluation function value related to a servo control parameter during machine learning will be described. As illustrated in FIG. 7, a display screen includes an adjustment flow section and a torque limit section, for example. Moreover, the display screen includes a section illustrating an adjustment target such as, for example, velocity feedforward, a status (state) such as during data harvesting, the number of trials indicating the total of the present number of trials with respect to a predetermined number of trials (hereinafter also referred to as a "largest number of trials") up to the end of machine learning, the smallest value among the set of evaluation function values acquired up to the present trials from the start of machine learning, and a button for selecting interruption and a drawing section disposed below the section, illustrating evaluation function values in respective trials correlated with the number of trials using points and illustrating the change in the smallest value among the set of evaluation function values acquired up to each trial correlated with the number of trials from the start of machine learning using broken lines. The adjustment flow section includes select axis, check parameter, check and edit, program, activate program, during machine learning, and adjustment result, for example. When an operator selects "during machine learning" in the "adjustment flow" section on the display screen illustrated in FIG. 7 of the display unit 309 such as a liquid crystal display device using the operation unit 304 such as a mouse or a keyboard, the control unit 305 outputs an output instruction for information including an evaluation function value f(PD(S)) related to the state S correlated with the number of trials, information on an adjustment target (learning target) of the machine learning, the number of trials, and the largest number of trials to the machine learning device 200 via the information output unit 302.

When the information acquisition unit 301 receives information including the evaluation function value f(PD(S)) related to the state S correlated with the number of trials, information on the adjustment target (learning target) of the machine learning, the number of trials, and the largest number of trials from the machine learning device 200, the control unit 305 stores the received information in the storage unit 306, obtains the smallest value of the set of evaluation function values f(PD(S)) related to the state S correlated with the number of trials stored up to that time and the change in the smallest value of the set of evaluation function values f(PD(S)) (all evaluation function values acquired from the start of machine learning) related to the state S up to a predetermined number of trials from the start of trial, stores the change in the smallest value and the received evaluation function value f(PD(S)) related to the state S correlated with the number of trials in the storage unit 306, and passes the control to the drawing plotting unit 303. The drawing plotting unit 303 creates a scatter diagram on the basis of the smallest value of the set of evaluation function values f(PD(S)) related to the state S correlated with the number of trials, performs a process of adding lines indicating the change in the smallest value of the set of evaluation function values f(PD(S)) related to the state S up to a predetermined number of trials from the start of trials to the scatter diagram, and creates image information of the scatter diagram, and passes the control to the control unit 305. The control unit 305 displays the scatter diagram to which the lines indicating the change in the smallest value are added as illustrated in FIG. 7. Moreover, the control unit 305 displays velocity feedforward in the adjustment target section of the display screen as illustrated in FIG. 7 on the basis of information indicating that velocity feedforward is an adjustment target, for example, and displays data harvesting in the status section of the display screen when the number of trials has not reached the largest number of trials. Furthermore, the control unit 305 displays the ratio of the number of trials to the largest number of trials (in this example, a ratio 85/100 of the number of trials 85 to the largest number of trials 100) in the number-of-trials section of the display screen and displays 26.634 as the smallest value of the evaluation function values f(PD(S)) related to the state S up to the present number of trials from the start of trials.

The display screen illustrated in FIG. 7 is an example and is not limited thereto. Information other than the items illustrated above may be displayed. Moreover, the display of information of several items illustrated above may be omitted. Moreover, in the above description, although the control unit 305 stores the information received from the machine learning device 200 in the storage unit 306 and displays the information related to the evaluation function value f(PD(S)) related to the state S correlated with the number of trials on the display unit 309 on a real-time basis, the present invention is not limited thereto. For example, the following examples are embodiments in which the information is not displayed on a real-time basis.

Modification 1

When an operator issues a display instruction, the information (information of the learning (trial result) performed up to that time by the machine learning device 200) illustrated in FIG. 7 is displayed.

Modification 2

When the total of the number of trials (from the start of learning) reaches a predetermined number of times, the information (information of the learning (trial result) performed up to that time by the machine learning device 200) illustrated in FIG. 7 is displayed.

Modification 3

When the evaluation function value f(PD(S)) related to the state S is equal to or smaller than a predetermined threshold, the information (information of the learning (trial result) performed up to that time by the machine learning device 200) illustrated in FIG. 7 is displayed.

Modification 4

When machine learning is interrupted or ended, the information (information of the learning (trial result) performed up to that time by the machine learning device 200) illustrated in FIG. 7 is displayed.

In Modifications 1 to 4 described above, similarly to the above-described real-time display operation, when the information acquisition unit 301 receives information including the evaluation function value f(PD(S)) related to the state S correlated with the number of trials, information related to the adjustment target (learning target) of the machine learning, the number of trials, and the largest number of trials from the machine learning device 200, the control unit 305 stores the received information in the storage unit 306. After that, the control unit 305 performs an operation of passing the control to the drawing plotting unit when an operator issues a display instruction in Modification 1, the total of the number of trials reaches a predetermined number of times in Modification 2, the evaluation function value f(PD(S)) related to the state S is equal to or smaller than a predetermined threshold in Modification 3, and the machine learning is interrupted or ended in Modification 4.

Next, a case in which the output device 300 outputs a serve control operation before and after adjustment will be described. When an operator selects "adjustment result" in the "adjustment flow" section of the display screen illustrated in FIG. 8 of the display unit 309 using the operation unit 304 such as a mouse or a keyboard on the display screen of FIG. 8, the control unit 305 issues an output instruction for the information on the set of position errors when machining is performed using the control parameter before adjustment (at the start of learning) and the set of position error when machining is performed using the control parameter after adjustment (after the end of learning) to the machine learning device 200 via the information output unit 302. Moreover, the control unit 305 may issue an instruction of sequentially activating a verification program slower than an evaluation program which is a learning machining program and a verification program faster than the evaluation program and an output instruction for the information on the set of position error during operation of the low-speed verification program and the set of position error during operation of the high-speed verification program to the numerical control device 400 via the information output unit 308.

When the information acquisition unit 301 receives the information on the set of position error when machining is performed using the control parameter before adjustment (at the start of learning) and the set of position error when machining is performed using the control parameter after adjustment (after the end of learning) from the machine learning device 200, the control unit 305 stores the received information in the storage unit 306 and passes control to the drawing plotting unit 303. The drawing plotting unit 303 creates image information of a drawing indicating the change over time in the position error before adjustment and a drawing indicating the change over time in the position error after adjustment from the set of position error before and after adjustment and passes the control to the control unit 303. The control unit 305 displays the diagram indicating the change over time in the position error before adjustment and the diagram indicating the change over time in the position error after adjustment on the d splay screen of FIG. 8.

Next, a case in which the output device 300 outputs a verification result will be described. When an operator selects "adjustment result" in the "adjustment flow" section of the display screen illustrated in FIG. 8 of the display unit 309 using the operation unit 304 such as a mouse or a keyboard on the display screen of FIG. 8, the output device 300 may output a verification result. When the "adjustment result" is selected, the output device 300 outputs an activation instruction for any one of a verification machining program (a verification program) slower than the learning machining program and a verification machining program (a verification program) faster than the learning machining program to the numerical control device 400. The servo control device 100 performs servo control of the servo motor 500 on the basis of the position command output from the numerical control device 400. When the information acquisition unit 301 receives information on the set of position error during operation of the low-speed verification program and the set of position error during operation of the high-speed verification program from the servo control device 100, the control unit 305 stores the received information in the storage unit 306 and passes the control to the drawing plotting unit 303. The drawing plotting unit 303 creates image information of the diagram indicating the change over time in the position error during operation of the low-speed verification program from the set of position error during operation of the low-speed verification program and the diagram indicating the change over time in the position error during operation of the high-speed verification program from the set of position error during operation of the high-speed verification program and passes the control to the control unit 305. The control unit 305 may display the diagram indicating the change over time in the position error during operation of the low-speed verification program and the change over time in the position error during operation of the high-speed verification program to the display screen of FIG. 8, respectively. As illustrated in a table at the left-bottom corner of FIG. 8, the change before and after learning may be displayed for each parameter such as a position error and a velocity error of the servo control device.

Figure 9:
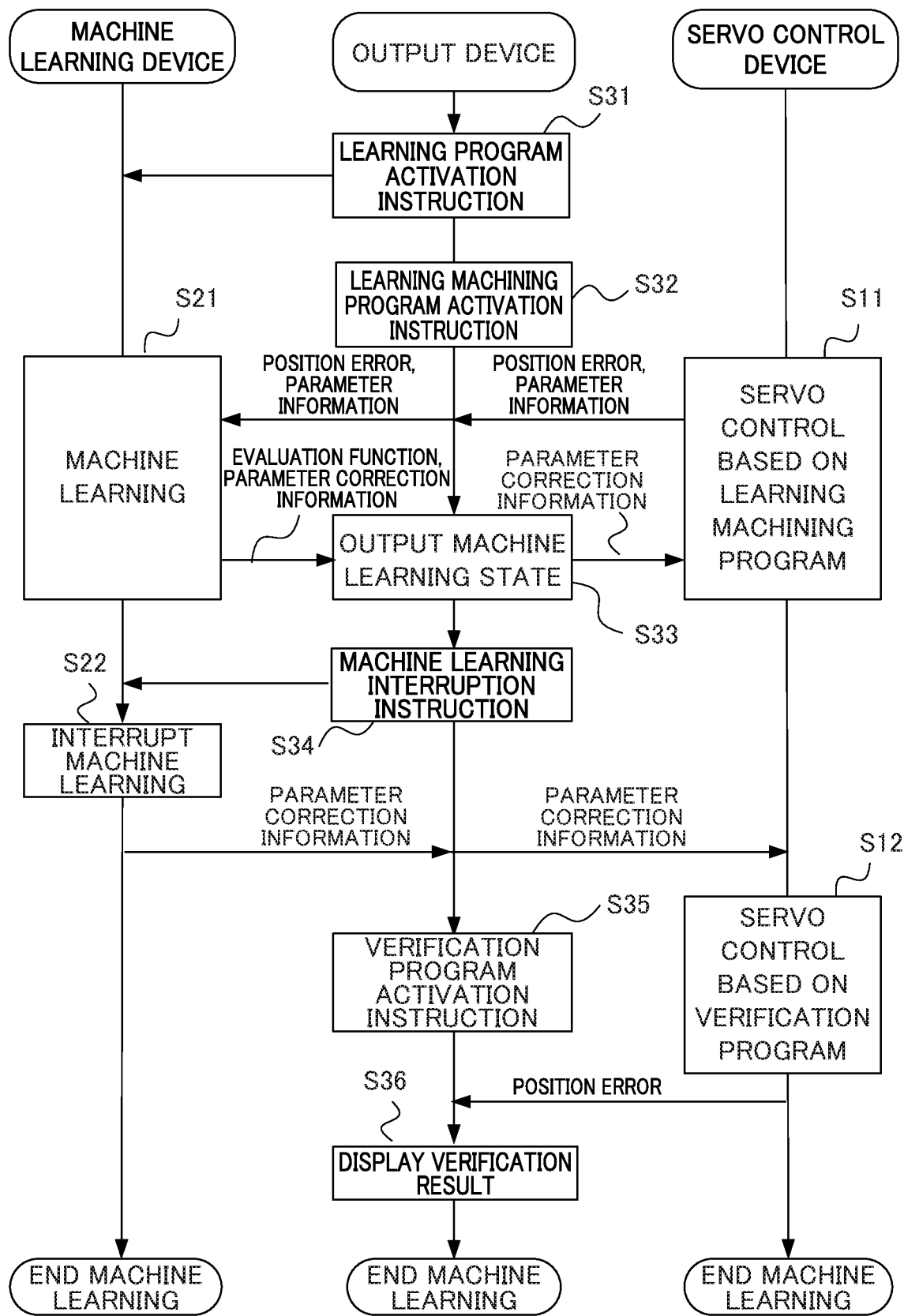
FIG. 9 is a flowchart illustrating an operation of the control device, focusing on the output device from the start of machine learning to display of adjustment results after the machine learning.

Next, the output function and the adjustment function of the output device 300 will be described FIG. 9 is a flowchart illustrating an operation of the control device, focusing on the output device from the start of machine learning to display of adjustment results after the machine learning. In step S31, in the output device 300, when an operator selects "program activation" in the "adjustment flow" section of the display screen of the display unit 309 illustrated in FIG. 7 or 8 using the operation unit 304 such as a mouse or a keyboard, the control unit 305 outputs a learning program activation instruction to the machine learning device 200 via the information output unit 302. Moreover, the output device 300 outputs a learning program activation instruction notification to the servo control device 100, indicating that the learning program activation instruction has been output to the machine learning device 200. Moreover, in step S32 after step S31, the output device 300 outputs a learning machining program activation instruction to the numerical control device 400 via the information output unit 308. Step S32 may be performed simultaneously with step S31 or before step S31. Upon receiving the learning machining program activation instruction, the numerical control device 400 activates the learning program to create a position command value and outputs the position command value to the servo control device 100. In step S21, the machine learning device 200 starts machine learning upon receiving the learning program activation instruction.

In step S11, the servo control device 100 controls the servo motor 500 to output feedback information including the position error and the coefficient (serving as parameter information) of the transfer function of the velocity feedforward processing unit 1082 to the output device 300. The output device 300 outputs the feedback information to the machine learning device 200. The machine learning device 200 outputs information including the evaluation function value f(PD(S)) related to the state S correlated with the number of trials used by the reward output unit 2021 during the machine learning operation performed in step S21, the largest number of trials, the number of trials, and the correction information (serving as parameter correction information) of the coefficient of the transfer function of the velocity feedforward processing unit 1082 to the output device 300. The output device 300 transmits the correction information of the coefficient of the transfer function of the velocity feedforward processing unit 1082 to the servo control device. Moreover, in step S33, when "during machine learning" in the "adjustment flow" section of the display screen illustrated in FIG. 7 is selected, the output device 300 outputs information related to a progress state of machine learning including the evaluation function value related to the servo control parameter during machine learning of the machine learning device 200 to the display unit 309 with the aid of the output function. Moreover, in step S33, when the "adjustment result" in the "adjustment flow" section of the display screen illustrated in FIG. 8 is selected, the output device 300 outputs a servo control operation (the change over time in position error) before and after adjustment to the display unit 309. Steps S11, S21, and S33 are repeatedly performed until machine learning is interrupted or ended. In this example, a case in which the information related to the progress state of the machine learning including the evaluation function value related to the servo control parameter during machine learning is output to the display unit 309 on a real-time basis has been described. However, in Modifications 1 to 4 described as an example of a case in which the information is not displayed on a real-time basis, the information related to the progress state of machine learning may be output to the display unit 309 on a real-time basis.

When an operator determines that the smallest value of all evaluation functions acquired from the start of the machine learning has settled sufficiently while observing the lines in the drawing of FIG. 7 and selects "interruption" on the display screen illustrated in FIG. 7 of the display unit 309 such as a liquid crystal display device using the operation unit 304 such as a mouse or a keyboard, the output device 300 outputs a machine learning interruption instruction to the machine learning device 200 and the numerical control device 400 in step S34.

Upon receiving the learning interruption instruction from the output device 300, the machine learning device 200 interrupts learning, generates action information on the basis of the value function Q when the instruction was received and outputs parameter correction information (the correction information of the coefficient of the transfer function of the velocity feedforward processing unit 1082) which is the generated action information from the optimization action information output unit 205. The parameter correction information is output to the servo control device 100 via the output device 300. When the operator selects "adjustment result" in the "adjustment flow" section after the operator selects "interruption" on the display screen illustrated in FIG. 7 of the display unit 309 and "interruption of machine learning" is displayed in the status of FIG. 7, the output device 300 may output an activation instruction for sequentially activating the verification machining program (the verification program) slower than the evaluation program which is the learning machining program and the verification machining program (the verification program) faster than the evaluation program which is the learning machining program to the numerical control device 400 in step S35.

Upon receiving the activation instruction for the low speed and high-speed verification programs, the numerical control device 400 sequentially activates the low-speed verification program and the high-speed verification program and outputs a position command to the servo control device 100. In step S12, the servo control device 100 controls the servo motor 500 with the aid of the low-speed verification program and the high-speed verification program and transmits information on the set of position error during operation of the low-speed verification program and the set of position error during operation of the high-speed verification program to the output device 300. The output device 300 outputs the information of the servo control device 100 to the display unit 309 with the aid of the output function described in step S36.

Second Embodiment

Figure 10:
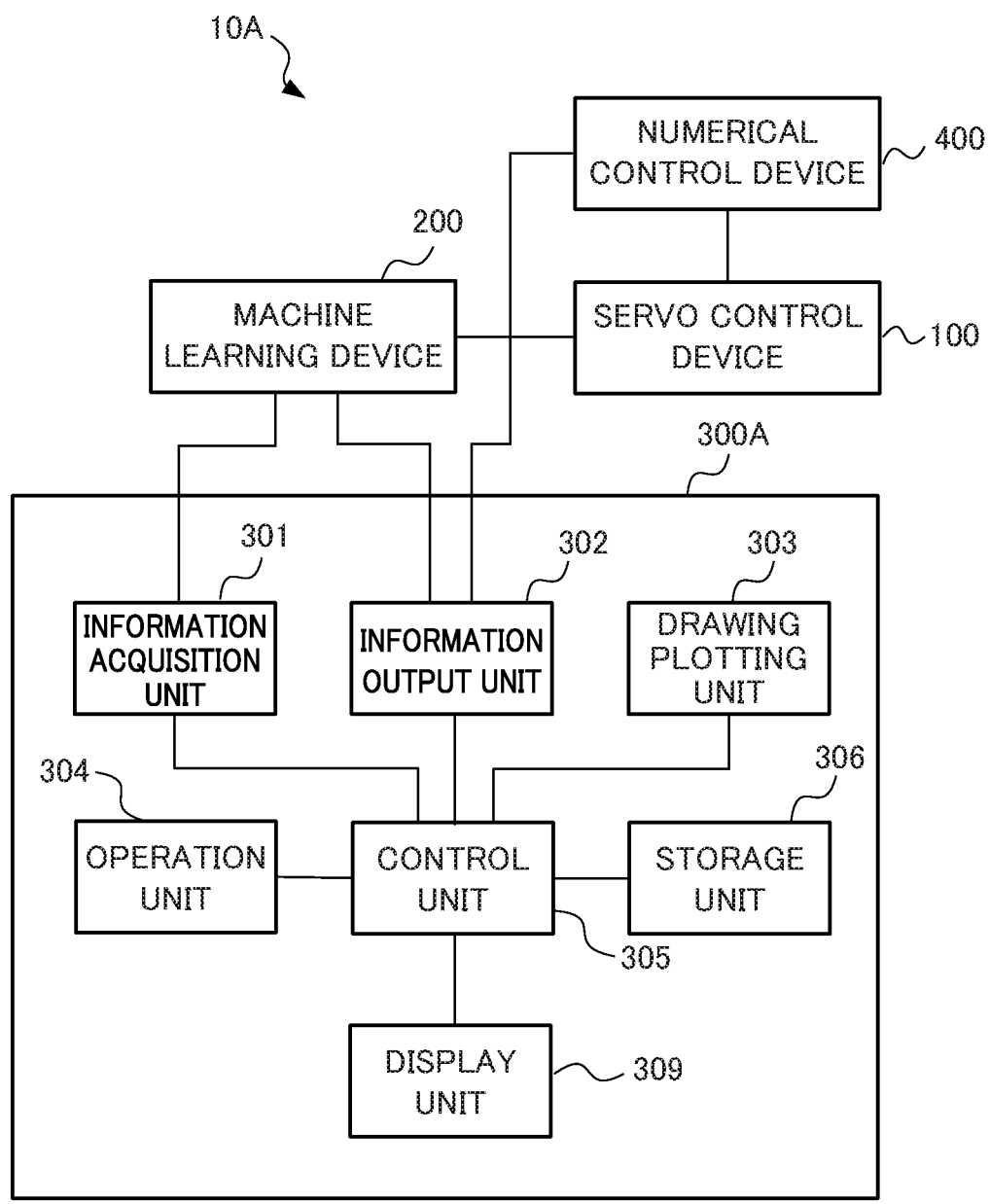
FIG. 10 is a block diagram illustrating a configuration example of an output device included in a control device according to a second embodiment of the present invention.

In the first embodiment, the output device 300 is connected to the servo control device 100, the machine learning device 200, and the numerical control device 400 to control relay of information (for example, a position error, a position command, and a coefficient of the velocity feedforward calculation unit) between the machine learning device 200 and the servo control device 100 and the operation of the servo control device 100 and the numerical control device 400 (for example, a learning program activation instruction for the machine learning device and a verification program activation instruction for the numerical control device 400). In the present embodiment, a case in which the output device is connected to the machine learning device and the numerical control device will be described FIG. 10 is a block diagram illustrating a configuration example of an output device included in a control device according to the second embodiment of the present invention. A control device 10A includes a servo control device 100, a machine learning device 200, an output device 300A, and a numerical control device 400. The output device 300A does not include the information acquisition unit 307 and the information output unit 308 unlike the output device 300 illustrated in FIG. 6.

Since the output device 300A is not connected to the servo control device 100, the output device 300A does not relay information (for example, a position error, a position command, and a coefficient of the velocity feedforward calculation unit) between the servo control device 100 and the machine learning device 200 and does not receive information (for example, a position error for verification of the servo control device 100) from the servo control device 100. Specifically, although the learning program activation instruction in step S31, the machine learning state output in step S33, and the machine learning interruption instruction in step S34 illustrated in FIG. 9 are performed, the other operations (for example, steps S35 and S36) illustrated in FIG. 9 are not performed. By doing so, since the output device 300A is not connected to the servo control device 100, the operation of the output device 300A decreases and the device configuration can be simplified.

Third Embodiment

Figure 11:
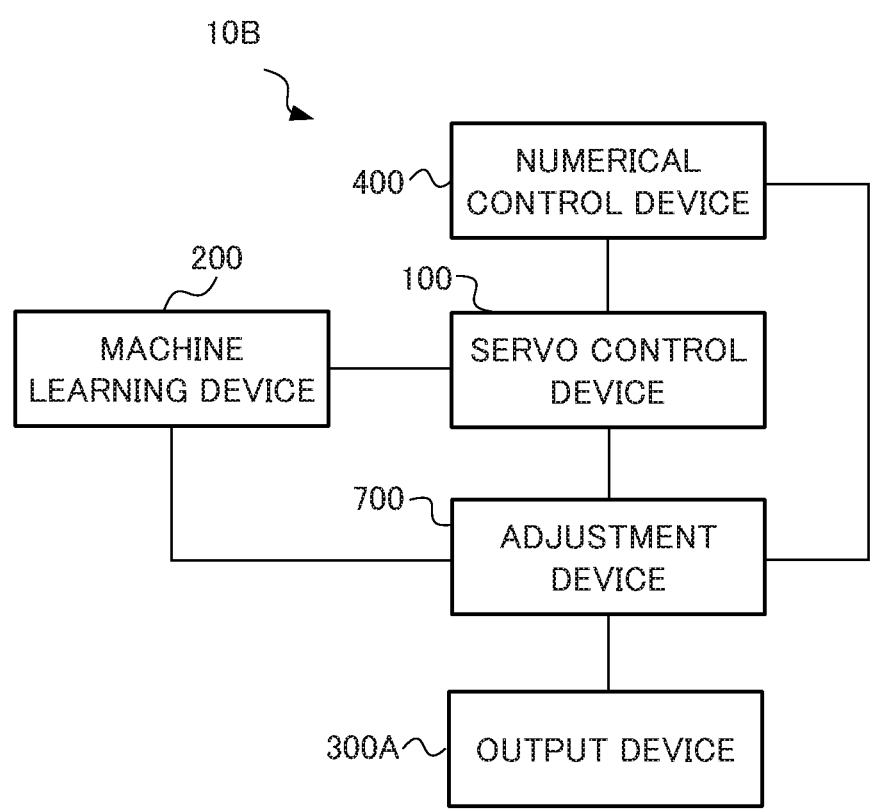
FIG. 11 is a block diagram illustrating a configuration example of a control device according to a third embodiment of the present invention.

In the first embodiment, the output device 300 is connected to the servo control device 100, the machine learning device 200, and the numerical control device 400. However, in the present embodiment, a case in which an adjustment device is connected to the servo control device 100, the machine learning device 200, and the numerical control device 400 and the output device is connected to the adjustment device will be described. FIG. 11 is a block diagram illustrating a configuration example of a control device according to a third embodiment of the present invention. A control device 10B includes a servo control device 100, a machine learning device 200, an output device 300A, a numerical control device 400, and an adjustment device 700. The output device 300A illustrated in FIG. 11 has the same configuration as the output device 300A illustrated in FIG. 10 except that the information acquisition unit 301 and the information output unit 302 are connected to the adjustment device 700 rather than the machine learning device 200. The adjustment device 700 has a configuration in which the drawing plotting unit 303, the operation unit 304, and the display unit 309 of the output device 300 of FIG. 6 are excluded.

The output device 300A illustrated in FIG. 11 performs a verification result display of step S36 in addition to the learning program activation instruction of step S31, the machine learning state output of step S33, and the machine learning interruption instruction of step S34 illustrated in FIG. 7 similarly to the output device 300A illustrated in FIG. 10 or the second embodiment. However, these operations are performed by the adjustment device 700. The adjustment device 700 relays information (for example, a position error, a position command, and a coefficient of the velocity feedforward calculation unit) between the machine learning device 200 and the servo control device 100. Moreover, the adjustment device 700 relays a learning program activation instruction to the machine learning device 200 and an activation instruction for the learning machining program, the low-speed verification program, or the high-speed verification program to the numerical control device 400 performed by the output device 300A to output the activation instructions to the machine learning device 200 and the numerical control device 400. By doing so, since the function of the output device 300 is distributed to the output device 300A and the adjustment device 700 as compared to the first embodiment, the operation of the output device 300A decreases and the device configuration can be simplified.

While the embodiments according to the present invention have been described, the servo control unit of the servo control device described above and the components included in the machine learning device may be realized by hardware, software or a combination thereof. The servo control method performed by cooperation of the components included in the servo control device described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)).

The above-described embodiment is a preferred embodiment of the present invention. However, the scope of the present invention is not limited to the embodiment only but the present invention can be embodied in various modifications without departing from the spirit of the present invention.

Modification in Which Output Device is included In Servo Control Device or Machine Learning Device In the above-described embodiments, an example in which the machine learning device 200, the servo control device 100, the output device 300 or 300A, and the numerical control device 400 are configured as a control device and an example in which the output device 300 is divided into the output device 300A and the adjustment device 700 and is provided in the control device have been described. In these examples, although the machine learning device 200, the servo control device 100, the output device 300 or 300A, the numerical control device 400, and the adjustment device 700 are configured as separate devices, one of these devices may be integrated with another device. For example, some or all of the functions of the output device 300 or 300A may be realized by the machine learning device 200, the servo control device 100, or the numerical control device 400. Moreover, the output device 300 or 300A may be provided outside the control device that includes the machine learning device 200, the servo control device 100, and the numerical control device 400.

Freedom in System Configuration

Figure 12:
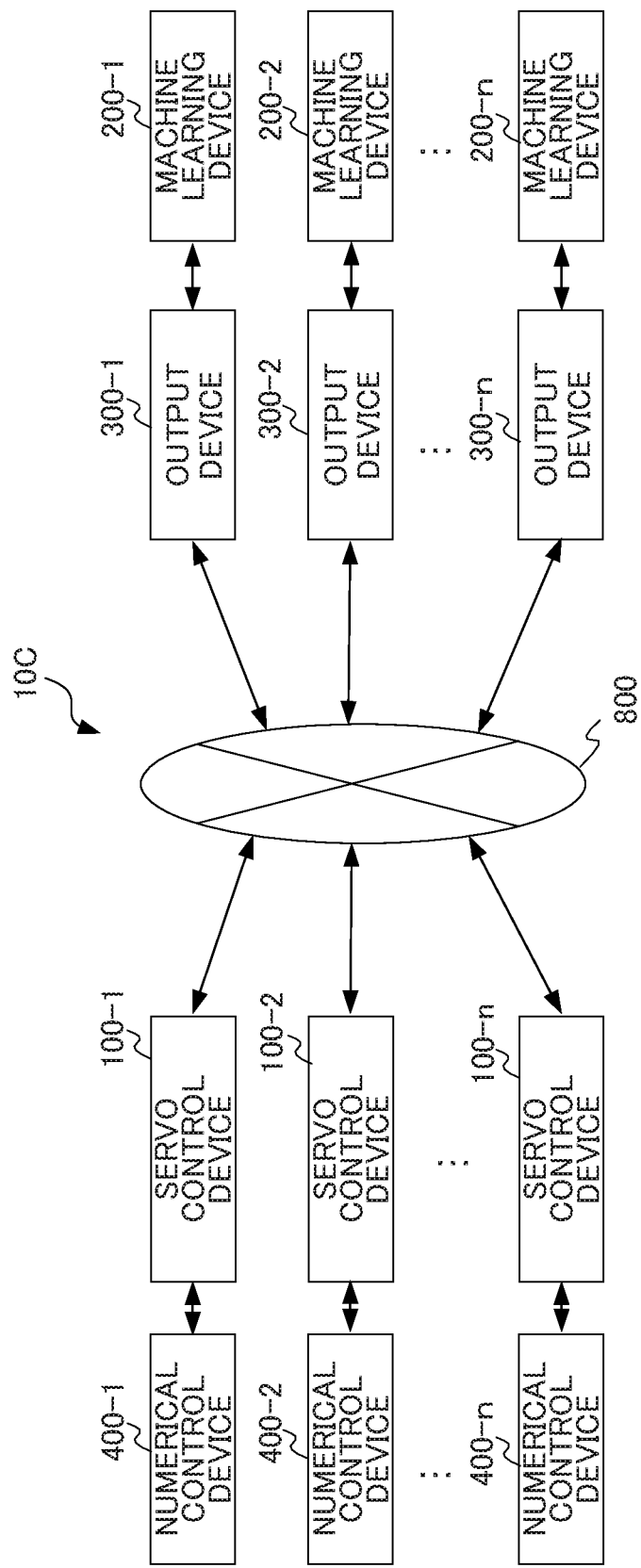
FIG. 12 is a block diagram illustrating a control device according to another configuration of the present invention.

FIG. 12 is a block diagram illustrating a control device according to another configuration. As illustrated in FIG. 12, a control device 10C includes n servo control devices 100-1 to 100-$n$, n machine learning devices 200-1 to 200-$n$, n output devices 300-1 to 300-$n$, n numerical control devices 400-1 to 400-$n$, and a network 800. Here, n is an arbitrary natural number. Each of the n servo control devices 100-1 to 100-$n$ corresponds to the servo control device 100 illustrated in FIGS. 1, 10, and 11. Each of the n machine learning devices 200-1 to 200-*n* corresponds to the machine learning device 200 illustrated in FIGS. 1, 10, and 11. The numerical control devices 400-1 to 400-*n* correspond to the numerical control device 400 and are provided in the servo control devices 100-1 to 100-*n*, respectively. Each of the output devices 300-1 to 300-*n* corresponds to the output device 300 or 300A illustrated in FIGS. 6 and 10. The output device 300A and the adjustment device 700 illustrated in FIG. 11 correspond to the output devices 300-1 to 300-*n*. The servo control devices 100-1 100-*n* may be included in the numerical control devices 400-1 to 400-*n*.

The servo control device 100-1 and the output device 300-1 are paired in a one-to-one relationship and are communicably connected. The servo control devices 100-2 to 100-*n* and the output devices 300-2 to 300-*n* are connected similarly to the servo control device 100-1 and the output device 300-1. Although n pairs of the servo control devices 100-1 to 100-*n* and the output devices 300-1 to 300-*n* are connected via the network 800 in FIG. 12, the n pairs of the servo control devices 100-1 to 100-*n* and the output devices 300-1 to 300-*n* may be connected directly via connection interfaces, respectively. A plurality of n pairs of the servo control devices 100-1 to 100-*n* and the output devices 300-1 to 300-*n* may be provided in the same plant, for example, and may be provided in different plants.

The network 800 is a local area network (LAN) constructed in a plant, the Internet, a public telephone network, or a combination thereof, for example. A specific communication scheme of the network 800, whether the network uses a cable connection or a wireless connection, and the like are not particularly limited.

In the control device of FIG. 12 described above, the output devices 300-1 to 300-*n* and the servo control devices 100-1 to 100-*n* are communicably connected as a one-to-one correlation. However, for example, one output device 300-1 and a plurality of servo control devices 100-1 to 100-*n* (m<n or m=n) may be communicably connected via the network 800, and one machine learning device connected to one output device 300-1 may perform the machine learning of each of the servo control devices 100-1 to 100-*m*. In this case, a distributed processing system may be adopted, in which respective functions of the machine learning device 200-1 are distributed to a plurality of servers as appropriate. The functions of the machine learning device 200-1 may be realized by utilizing a virtual server function, or the like, in a cloud. When there are a plurality of machine learning devices 200-1 to 200-*n* corresponding to a plurality of servo control devices 100-1 to 100-*n*, respectively, of the same type name, the same specification, or the same series, the machine learning devices 200-1 to 200-*n* may be configured to share learning results in the machine learning devices 200-1 to 200-*n*. By doing so, a more optimal model can be constructed.

EXPLANATION OF REFERENCE NUMERALS

10, 10A, 10B, 10C: Control device
100, 100A: Servo control device
101: Subtractor
102: Position control unit
103: Adder
104: Subtractor
105: Velocity control unit
106: Adder
107: Integrator
108: Velocity feedforward calculation unit
109: Position feedforward calculation unit
200: Machine learning device
201: State information acquisition unit
202: Learning unit
203: Action information output unit
204: Value function storage unit
205: Optimization action information output unit
300: Output device
400: Numerical control device
500: Servo motor
600: Control target
700: Adjustment device
800: Network

What is claimed is:

1. A control device comprising:
a servo control device that controls a servo motor that drives a shaft of a machine tool, a robot, or an industrial machine;
a machine learning device that performs machine learning with respect to the servo control device;
a numerical control device that outputs a control command to the servo control device; and
an output device including a memory configured to store a program, and a processor configured to execute the program and control the output device,
the processor being configured to execute the program to:
control an operation of the machine learning device and output a program activation instruction to the numerical control device;
acquire a plurality of evaluation function values which are obtained using servo data or are calculated using the servo data, the plurality of evaluation function values being acquired from a machine learning device that performs machine learning with respect to a servo control device that controls a servo motor that drives a shaft of a machine tool, a robot, or an industrial machine; and
output the plurality of acquired evaluation function values.

2. The control device according to claim 1, wherein
the processor is further configured to execute the program and relay information between the machine learning device and the servo control device.

3. The control device according to claim 1, further comprising an adjustment device that relays information between the machine learning device and the servo control device, wherein the processor is further configured to execute the program, control the operation of the machine learning device and output the program activation instruction to the numerical control device, via the adjustment device, and acquire the plurality of evaluation function values from the machine learning device via the adjustment device.

4. The control device according to claim 1, wherein
the processor is further configured to execute the program and control the output device to display, via a display unit the plurality of evaluation function values on a display screen.

5. The control device according to claim 4, wherein
the processor is further configured to execute the program and control the output device to create a drawing indicating change over time in the plurality of evaluation function values during machine learning, wherein the created drawing is displayed on the display screen.

6. The control device according to claim 1, wherein
the processor is further configured to execute the program and control the output device to output a smallest value of the plurality of evaluation function values.

7. The control device according to claim 1, wherein the processor is further configured to execute the program and control the output device to output a smallest value of all the evaluation function values acquired from the start of machine learning.

8. The control device according to claim 1, wherein the processor is further configured to execute the program and control the output device to output the plurality of acquired evaluation function values on a real-time basis.

9. The control device according to claim 1, wherein the processor is further configured to execute the program and control the output device to output the plurality of acquired evaluation function values when an operator outputs a display instruction.

10. The control device according to claim 1, wherein the processor is further configured to execute the program and control the output device to output the plurality of acquired evaluation function values when a total of the number of trials from the start of learning reaches a predetermined number of times.

11. The control device according to claim 1, wherein the processor is further configured to execute the program and control the output device to output the plurality of acquired evaluation function values when the evaluation function value is equal to or smaller than a predetermined threshold.

12. The control device according to claim 1, wherein the processor is further configured to execute the program and control the output device to output the plurality of acquired evaluation function values when machine learning is interrupted or ended.

13. The control device according to claim 1, the processor is further configured to execute the program and control the output device to output an interruption instruction to the machine learning device.

14. The control device according to claim 1, wherein the processor is further configured to execute the program and control the output device to output an interruption instruction when a smallest value of all the evaluation function values acquired from the start of machine learning has settled.

15. The control device according to claim 1, wherein the output device is included in one of the servo control device, the machine learning device, and the numerical control device.

* * * * *